United States Patent
Grethel et al.

(10) Patent No.: US 7,552,929 B2
(45) Date of Patent: Jun. 30, 2009

(54) ACTIVE ROLL STABILIZATION APPARATUS

(75) Inventors: Marco Grethel, Bühlertal (DE);
Manfred Homm, Bühl-Neusatz (DE)

(73) Assignee: LuK Lamelten und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 11/906,753

(22) Filed: Oct. 3, 2007

(65) Prior Publication Data
US 2008/0111325 A1 May 15, 2008

Related U.S. Application Data

(63) Continuation of application No. PCT/DE2006/000520, filed on Mar. 24, 2006.

(30) Foreign Application Priority Data
Apr. 7, 2005 (DE) .................. 10 2005 015 967

(51) Int. Cl.
*B60G 21/055* (2006.01)
*B60G 21/00* (2006.01)

(52) U.S. Cl. .................. 280/5.511; 280/5.5; 280/5.508; 280/124.106; 280/124.157; 280/124.16

(58) Field of Classification Search .................. 280/5.5, 280/5.508, 5.511, 124.106, 124.157, 124.16
See application file for complete search history.

(56) References Cited

U.S. PATENT DOCUMENTS

| 5,095,697 | A | 3/1992 | Kauss | 60/452 |
| 5,735,540 | A | 4/1998 | Schiffler | 280/5.501 |
| 6,039,326 | A | 3/2000 | Agner | 280/5.506 |
| 7,318,594 | B2* | 1/2008 | Grethel et al. | 280/124.106 |
| 2003/0047898 | A1* | 3/2003 | Nagy et al. | 280/124.157 |
| 2007/0013151 | A1 | 1/2007 | Grethel et al. | 280/5.508 |

FOREIGN PATENT DOCUMENTS

| DE | 103 34 705 A1 | 2/2004 |
| EP | 0 850 151 B1 | 10/2001 |
| EP | 1 175 307 B1 | 7/2003 |
| WO | WO 2005/072999 A1 | 8/2005 |

* cited by examiner

*Primary Examiner*—John Q. Nguyen
*Assistant Examiner*—Barry Gooden, Jr.
(74) *Attorney, Agent, or Firm*—Alfred J. Mangels

(57) ABSTRACT

Apparatus for the active stabilization of the rolling of a vehicle that has at least two axles that each have at least two wheels. The axles are each equipped with a transverse stabilizer that is hydraulically actuated by a directional control valve. The transverse stabilizers are operated by respective hydraulic motors. A pressure supply pump applies different hydraulic pressure levels through respective pressure limiting valves. The directional control valve is actuated hydraulically by a directly controlled control valve.

14 Claims, 3 Drawing Sheets

ACTIVE ROLL STABILIZATION APPARATUS

CROSS-REFERENCE TO RELATED APPLICATION

This is a continuation of International application Ser. No. PCT/DE2006/000520, with an international filing date of Mar. 24, 2006, and designating the United States, the entire contents of which are hereby incorporated by reference to the same extent as if fully rewritten.

BACKGROUND OF THE INVENTION

1. Field of the Invention

The present invention relates to apparatus for active roll stabilization of a motor vehicle having at least two axles, which each have at least two wheels and are each equipped with a transverse stabilizer, whereby the transverse stabilizers can be activated using a direction-switching valve device using hydraulic devices, which can be acted upon by a pressure supply unit, such as a pump, through axle pressure-limiting valves with varying pressure levels.

2. Description of the Related Art

Roll stabilization devices are also designated as anti-roll systems or roll stabilization systems. FIG. 1 shows a hydraulic diagram of a conventional roll stabilization device.

An object of the present invention is to provide a device for the active roll stabilization of a motor vehicle having at least two axles, which respectively have at least two wheels and are respectively equipped with a transverse stabilizer, whereby the transverse stabilizers can be activated using a direction-switching valve device using hydraulic devices, on which a pressure supply unit, such as a pump, can apply different pressure levels via axle pressure-limiting valves, which is more cost effective to manufacture than conventional roll stabilization devices.

SUMMARY OF THE INVENTION

The object is achieved in a device for active roll stabilization of a motor vehicle having at least two axles, which respectively have at least two wheels and are respectively equipped with a transverse stabilizer, whereby the transverse stabilizers can be activated using a direction-switching valve device through hydraulic devices, on which a pressure supply unit, such as a pump, can apply different pressure levels via axle pressure-limiting valves, in that the direction-switching valve device is actuated hydraulically by means of a directly actuated control valve device. Within the scope of the present invention, it was found that the cost of the magnetic coil used in conventional anti-roll systems for direct actuation of the direction-switching valve device is not negligible. In contrast, the present invention provides the advantage that a commercially available, economical, directly actuated control valve can be used. Compared to the pilot control of the axle pressure-limiting valves via a separate pilot control circuit with a pressure regulator connected downstream from the pump, the roll stabilization device of the invention advantageously provides a simple design without a pilot control circuit. Besides, the pressure regulator can be dispensed with in any case, thus minimizing system leakage.

A preferred embodiment of the roll stabilization device is characterized in that the control valve device includes a valve spool or valve plunger, which interacts with a proportional magnet. The valve spool produces the pressure for the hydraulic actuation of the direction-switching valve device, which pressure is proportional to the strength of the proportional magnet.

A further preferred embodiment of the roll stabilization device is characterized in that the control valve device is formed by a control pressure-limiting valve, which is connected in parallel to the axle pressure-limiting valves. The control pressure-limiting valve raises the system pressure to a system pressure required for a desired switch combination. The axle pressure-limiting valves then only need to adjust the remaining pressure differentials to the required axle pressures in each case.

A further preferred embodiment of the roll stabilization device is characterized in that the control valve device is formed by a control pressure valve, which is connected in series to the pressure supply unit. In the deenergized state of the control pressure-reducing valve, the hydraulic actuator spaces of the direction-switching valve device and, if necessary, a fail-safe valve are selectively held at the tank pressure level. That should ensure that the direction-switching valve and, if necessary, the fail-safe valve, remain at their normal positions. In order to adjust the control pressure, a minimum pressure, e.g. 2.5 bar, is set by means of one of the axle pressure-limiting valves.

A further preferred embodiment of the roll stabilization device is characterized in that the control valve device is acted upon by the pressure from a tank, from which the pressure supply unit is fed. In that way, it is ensured that a change in the tank pressure level, e.g. by temperature influence, does not lead to a change in the switch points at the direction-switching valve device.

A further preferred embodiment of the roll stabilization device is characterized in that the axle pressure-limiting valves are acted upon by the pressure from a tank that supplies the pressure supply unit. The axle pressure-limiting valves feature a plunger chamber and a spring chamber that each are specifically acted upon by the tank pressure level. That has the advantage that the magnets used in the axle pressure-limiting valves need not be designed to be pressure-resistant.

A further preferred embodiment of the roll stabilization device is characterized in that the direction-switching valve device includes a 7/2 directional control valve. The 7/2 directional control valve is intended for direction-switching of the hydraulic devices and is actuated hydraulically via the control valve device.

A further preferred embodiment of the roll stabilization device is characterized in that a hydraulically actuated fail-safe valve is connected between the direction-switching valve device and one of the hydraulic devices. Both the direction-switching valve device and the fail-safe valve are controlled by one and the same control valve device. In this way, the manufacturing costs of the roll stabilization device in accordance with the present invention can be reduced.

A further preferred embodiment of the roll stabilization device is characterized in that the fail-safe valve is acted upon by the pressure from a tank from which the pressure supply unit is fed. In that way, it is ensured that a change in the tank pressure level, e.g. by the influence of temperature, does not lead to a change in the switch points at the fail-safe valve.

BRIEF DESCRIPTION OF THE DRAWINGS

Further advantages, characteristics, and details of the present invention will become apparent from the following description in which embodiments of the invention are explained in more detail with reference to the drawings. The features mentioned in the claims and description can each be fundamental to the present invention as such, or in any combination thereof. In the drawings:

DESCRIPTION OF THE PREFERRED EMBODIMENTS

Figure 1:
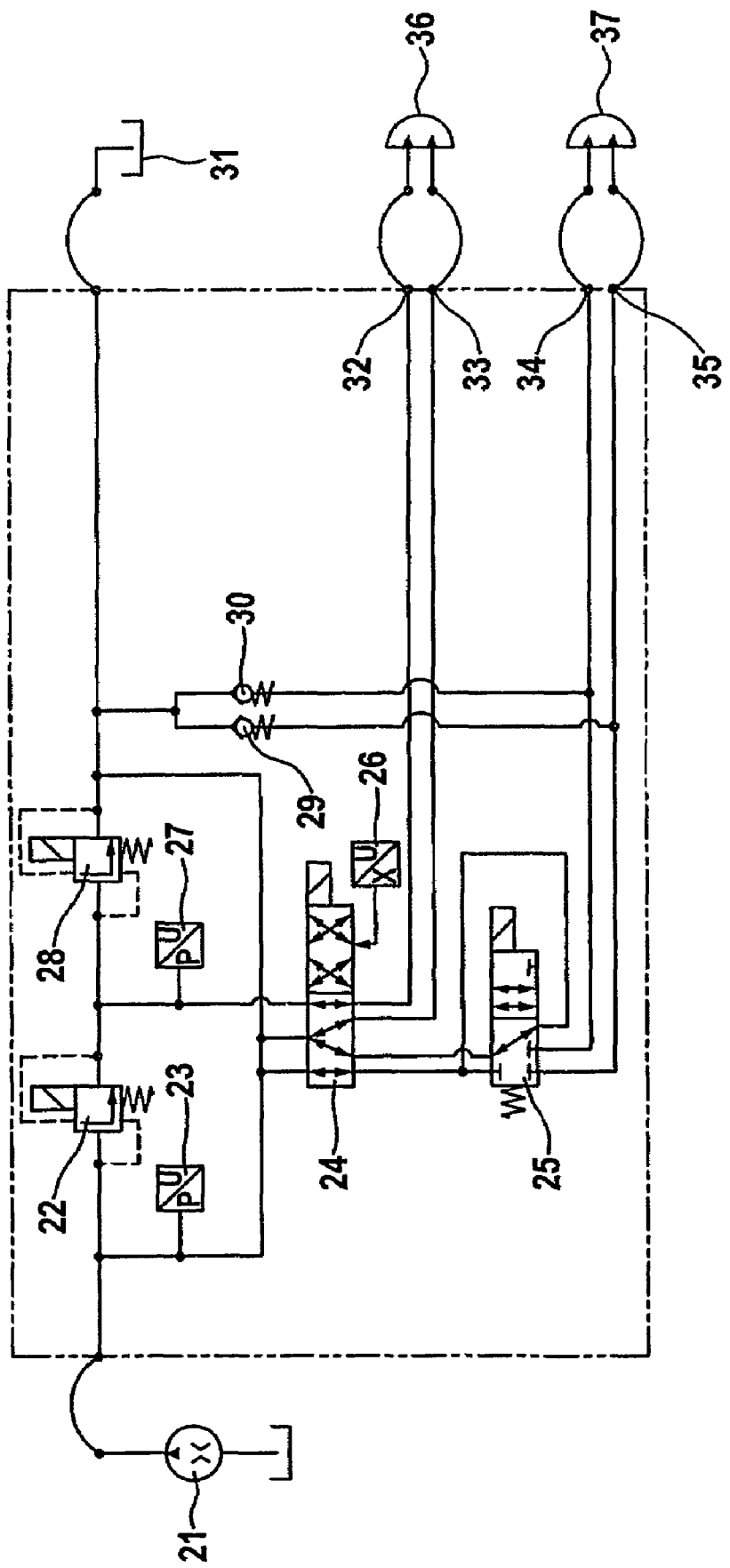
FIG. 1 is a hydraulic circuit diagram of a conventional roll stabilization device.

FIG. 1 shows the actual state of a standard system. The pressure supply unit is a suction-throttled radial piston pump 21, which provides two different pressure levels via a series connection using two proportional pressure-limiting valves 22 and 28 designated as axle pressure-limiting valves and switched as differential pressure valves. The pressure levels are monitored by pressure sensors 23 and 27. Those different pressure levels are for a rotary motor 37 at the front axle stabilizer 35 for the right side and 34 for the left side, respectively, and correspondingly for a rotary motor 36 at the rear axle stabilizer 33 and 32. The pressure at the rear axle must always be lower than or equal to the pressure at the front axle. Those two pressure levels are reduced and/or increased by means of a 7/2 directional control valve 24, also designated as a direction-switching valve, which, depending upon the direction of turning, is switched to the right or left, so that the pressure in the rotary motors is either reduced or increased on the right or left side of the motor vehicle, respectively, at constant velocity. The operation of the direction-switching valve 24 is monitored by means of a control position detection sensor 26.

In addition, a fail-safe valve 25 is arranged on the front axle, which in a fail-safe case blocks the rotary motor 37 of the front axle and depressurizes the rotary motor 36 of the rear axle when a valve is jammed and/or there is a power failure. Additionally, two feeder valves 29 and 30 are installed that can connect the pressure branches 35 and 34 of the rotary motor 37 at the front axle with a tank 31 via a tank line, and namely in such a way that throttled unrestricted oscillation of the rotary motor 37 over the leakage points in the rotary motor can take place without cavitation problems even by resuctioning the volumetric flow.

The basic approach of the present invention is that cost intensive elements are dispensed with. That relates particularly to the reduction of electromagnets of directly controlled valves. In accordance with the present invention, the operation of different valve spools can in part be combined. In accordance with a further aspect of the present invention, a directly controlled hydraulic concept is created, which is simple to construct and cost effective to manufacture. An essential characteristic of the present invention is that both switch magnets of the direction-switching valve 24 and of the fail-safe valve 25 can be replaced by one proportional magnet of a control valve.

Figure 2:
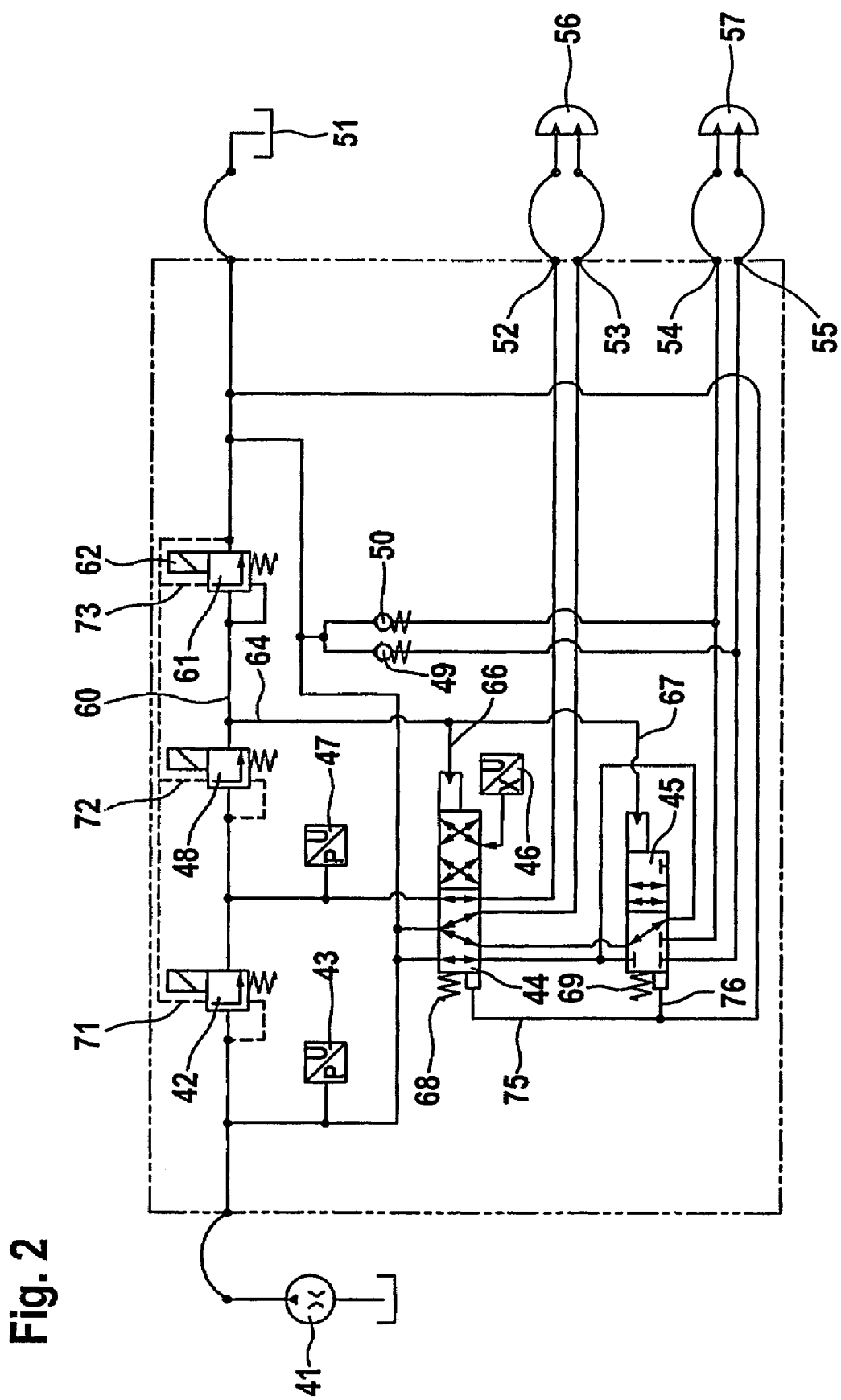
FIG. 2 is a hydraulic circuit diagram of an embodiment of a roll stabilization device in accordance with the present invention with a control pressure-limiting valve and FIG. 3 is a hydraulic circuit diagram of a second embodiment of a roll stabilization device in accordance with the present invention with a control pressure-limiting valve.

In accordance with the embodiment illustrated in FIG. 2, the desired result is achieved by connecting an additional pressure-limiting valve 61 in series with the proportional pressure-limiting valves 42 and 48, which are also designated as axle-pressure-limiting valves. The additional pressure-limiting valve 61, which is also designated as a control-pressure-limiting valve, is used for hydraulically actuating the 7/2 directional control valve 44 and fail-safe valve 45. Alternatively, in accordance with the embodiment illustrated in FIG. 3, an additional pressure-limiting valve 81, which is also designated as a control pressure-limiting valve, can be connected parallel to the pump pressure for the pressure supply to the rotary motors, and for the pressure supply to the 7/2 directional control valve 44 and fail-safe valve 45. In accordance with a further aspect of the present invention, instead of the pressure-limiting valves 22 and 28, pressure-limiting valves 42, 48 having tank pressure compensation are used.

FIG. 2 illustrates a hydraulic diagram similar to that shown in FIG. 1 and in accordance with a first embodiment of the present invention. The pressure supply unit is a suction-throttled radial piston pump 41, which provides two different pressure levels via a series connection by means of two proportional pressure-limiting valves 42 and 48. Both proportional pressure-limiting valves 42 and 48 are also designated as axle-pressure-limiting valves. Unlike the known roll stabilization device illustrated in FIG. 1, the axle-pressure valves are not differential pressure-limiting valves but normal pressure-limiting valves. The spool and spring spaces of the axle-pressure-limiting valves 42 and 48 are each connected specifically with the tank 51 pressure level via a relief line 71, 72. The pressure levels provided by the axle-pressure-limiting valves 42 and 48 are monitored by pressure sensors 43 and 47.

As in the conventional roll stabilization device shown in FIG. 1, the pressure levels or pressure ranges for a rotary motor 57 on the front axle stabilizer are designated by 55 for the right side and by 54 for the left side, respectively, and correspondingly by 53 and by 52 for a rotary motor 56 on the rear axle stabilizer. The pressure at the rear axle must always be lower than or equal to the pressure at the front axle. On rounding a curve, both pressure levels are switched to the right or left, depending upon the turning direction, by means of 7/2 directional control valve 44, also designated as a direction-switching valve, so that the pressures in the rotary motors are either reduced or increased, respectively, on the right or left side of the motor vehicle at constant velocity. The operation of the directional control valve 44 is monitored by means of a control position detection sensor 46.

In addition, a fail-safe valve 45 is arranged on the front axle, which in a fail-safe case blocks the rotary motor of the front axle 57 and depressurizes the rotary motor of the rear axle 56 when a valve is jammed and/or there is a power failure. Additionally, two feeder valves 49 and 50 are installed that can connect the pressure branches 55 and 54 of the rotary motor 57 at the front axle with a tank line and a tank 51 in such a way that throttled unrestricted oscillation of the rotary motor 57 over the leakage points in the rotary motor can take place without cavitation problems even by resuctioning the volumetric flow.

In the embodiment illustrated in FIG. 2, the directional control valve 44 and fail-safe valve 45 are provided with valve spools and not with switch magnets like the roll stabilization device shown in FIG. 1. Instead, the end surfaces of the valve spools of the directional control valve 44 and fail-safe valve 45 are specifically acted upon with pressure. In the embodiment illustrated in FIG. 2, that pressure is provided via a control-pressure-limiting valve 61, which is connected in series with the proportional pressure-limiting valve 48, into a line 60 originating at the proportional pressure-limiting valve 48. The control-pressure-limiting valve 61 is preferably a spool valve and includes a valve spool that provides a control pressure proportional to the strength of a proportional magnet 62. The control pressure is led to both directional control valve 44 and fail-safe valve 45 via a line 64 and lines 66 and 67.

The directional control valve 44 is biased by a spring 68 to the switch position illustrated in FIG. 2. Similarly, the fail-safe valve 45 is biased by a spring 69 to the switch position illustrated in FIG. 2. The springs 68 and 69 of the directional control valve 44 and fail-safe valve 45 are designed such that the fail-safe valve 45 switches at a control pressure of, e.g., 2.5 bar, and the directional control valve 44 still remains at its normal position. At a control pressure of, e.g., 5 bar, the directional control valve 44 will then switch as well. In such a case, the fail-safe valve 45 will remain switched as well.

During operation of the roll stabilization device illustrated in FIG. 2, the control-pressure-limiting valve 61 connected in series with the axle-pressure-limiting valves 42 and 48 increases the system pressure by the control pressure required for the desired switch combination. The axle pressure-limiting valve 48 for the rear axle then only needs to regulate the remaining differential pressure for the required rear axle pressure. The same applies to the subsequent pressure series with the axle-pressure-limiting valve 42 for the front axle.

The pressure relief lines 75 and 76 originate at the directional control valve 44 and fail-safe valve 45, by which the tank pressure from tank 51 is applied to the actuator spaces of the directional control valve 44 and fail-safe valve 45. That ensures that a change in the tank pressure level, e.g. by the influence of temperature, does not lead to a distortion of the switch points at the directional control valve 44 and fail-safe valve 45.

Figure 3:
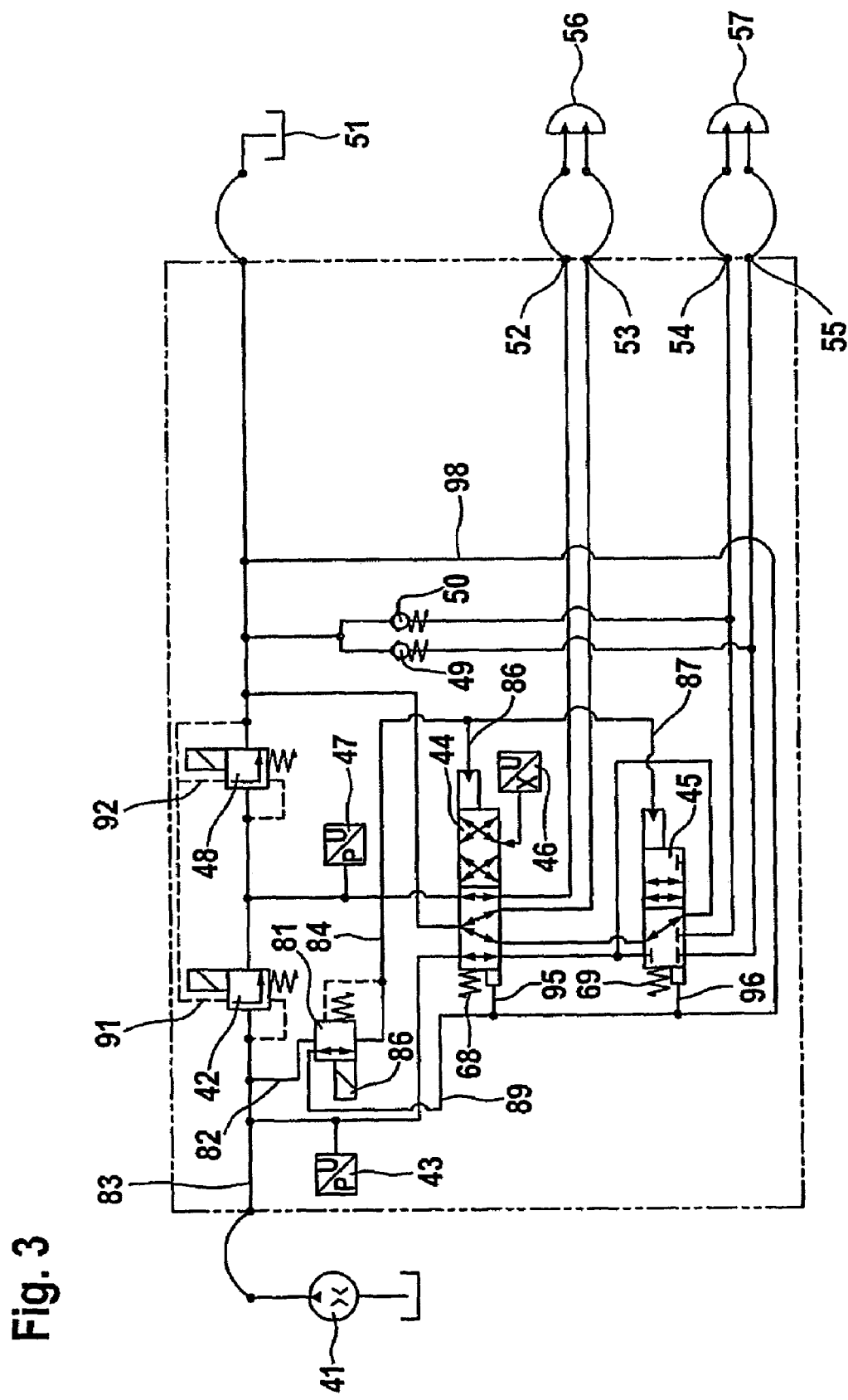

In FIG. 3, a hydraulic diagram similar to the hydraulic diagram illustrated in FIG. 2 is shown. The same reference numerals are used to designate similar parts. For the description of those parts, reference is made to the preceding description of FIG. 2. The following description will basically address the differences between the embodiments illustrated in FIGS. 2 and 3.

In the embodiment illustrated in FIG. 3, the control pressure is provided by a control-pressure-limiting valve 81, which is provided by a line 82 originating at a connection line 83 that connects the pump 41 to the axle pressure-limiting valve 42, and which is connected in series with the pump 41 and parallel to the axle-pressure-limiting valves 42, 48. Hence, pump pressure is applied to the control-pressure-limiting valve 81. The control-pressure-limiting valve 81 having a proportional magnet 85, like the control-pressure-limiting valve 61 in FIG. 2, serves to provide control pressure to the directional control valve 44 and fail-safe valve 45. For that purpose, the control-pressure-limiting valve 81 is connected to the directional control valve 44 and fail-safe valve 45 via a line 84 and lines 86 and 87.

In the deenergized state, the hydraulic actuator spaces of the directional control valve 44 and fail-safe valve 45 are applied specifically on the tank pressure level of tank 51 by means of the control-pressure-limiting valve 81 through a pressure relief line 89, so that the directional control valve 44 and fail-safe valve 45 remain firmly at their normal positions. In order to adjust the control pressure, a minimum pressure of, e.g., 2.5 bar is preferably set by means of the axle-pressure-limiting valve 48.

As in the embodiment illustrated in FIG. 2, in the embodiment in accordance with FIG. 3, the axle-pressure-limiting valves 42 and 48 are also connected to the tank pressure level of tank 51 via lines 91 and 92. Likewise, the actuator spaces of the directional control valve 44 and fail-safe valve 45 are connected to the tank pressure level of tank 51 via the pressure relief lines 95 and 96 by a line 98.

What is claimed is:

1. Apparatus for active roll stabilization of a motor vehicle having at least two axles, which respectively have at least two wheels and are respectively equipped with a transverse stabilizer, said apparatus comprising: a directional control valve for hydraulically actuating the transverse stabilizers through respective hydraulic motors operatively connected with the respective transverse stabilizers; a pressure supply pump for applying different hydraulic pressure levels; axle-pressure-limiting valves operatively connected with the pump for controlling the hydraulic motors, wherein the directional control valve is actuated hydraulically by a directly actuated control valve, and wherein the directly actuated control valve is a control-pressure-limiting valve that is connected in series with the axle pressure-limiting valves.

2. Apparatus in accordance with claim 1, wherein the directly actuated control valve includes a movable valve spool that operates together with a proportional magnet.

3. Apparatus in accordance with claim 1, wherein the directly actuated control valve is acted upon by hydraulic pressure in a tank from which the pressure supply pump is fed.

4. Apparatus in accordance with claim 1, wherein the axle-pressure-limiting valves are acted upon by hydraulic pressure from a tank from which the pressure supply pump is fed.

5. Apparatus in accordance with claim 1, wherein the directional control valve is a 7/2 directional control valve.

6. Apparatus in accordance with claim 1, including a fail-safe valve connected between the directional control valve and at least one of the hydraulic motors that are actuated hydraulically by the directly actuated control valve.

7. Apparatus in accordance with claim 6, wherein the fail-safe valve and the directional control valve are acted upon by hydraulic pressure from a tank from which the pressure supply pump is fed.

8. Apparatus for active roll stabilization of a motor vehicle having at least two axles, which respectively have at least two wheels and are respectively equipped with a transverse stabilizer, said apparatus comprising: a directional control valve for hydraulically actuating the transverse stabilizers through respective hydraulic motors operatively connected with the respective transverse stabilizers; a pressure supply pump for applying different hydraulic pressure levels; axle-pressure-limiting valves operatively connected with the pump for controlling the hydraulic motors, wherein the directional control valve is actuated hydraulically by a directly actuated control valve, and wherein the directly actuated control valve is a control-pressure-limiting valve that is connected in parallel to the axle-pressure-limiting valves.

9. Apparatus in accordance with claim 8, wherein the directly actuated control valve includes a movable valve spool that operates together with a proportional magnet.

10. Apparatus in accordance with claim 8, wherein the directly actuated control valve is acted upon by hydraulic pressure in a tank from which the pressure supply pump is fed.

11. Apparatus in accordance with claim 8, wherein the axle-pressure-limiting valves are acted upon by hydraulic pressure from a tank from which the pressure supply pump is fed.

12. Apparatus in accordance with claim 8, wherein the directional control valve is a 7/2 directional control valve.

13. Apparatus in accordance with claim 8, including a fail-safe valve connected between the directional control valve and at least one of the hydraulic motors that are actuated hydraulically by the directly actuated control valve.

14. Apparatus in accordance with claim 13, wherein the fail-safe valve and the directional control valve are acted upon by hydraulic pressure from a tank from which the pressure supply pump is fed.

* * * * *